(12) United States Patent
Nunnelee

(10) Patent No.: US 7,424,832 B1
(45) Date of Patent: Sep. 16, 2008

(54) CABLE TENSIOMETER FOR AIRCRAFT

(75) Inventor: Mark Nunnelee, Lancaster, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 11/849,843

(22) Filed: Sep. 4, 2007

(51) Int. Cl.
*G01L 1/04* (2006.01)
(52) U.S. Cl. .................................. 73/862.472
(58) Field of Classification Search ................. 73/831, 73/862.46, 862.472
See application file for complete search history.

(56) References Cited

U.S. PATENT DOCUMENTS

| | | | | |
|---|---|---|---|---|
| 4,587,855 A | * | 5/1986 | Yamada et al. | 73/862.451 |
| 4,803,888 A | * | 2/1989 | Choquet | 73/862.392 |
| 4,989,450 A | | 2/1991 | Shoberg et al. | |
| 4,992,778 A | * | 2/1991 | McKeen et al. | 340/668 |
| 5,728,953 A | | 3/1998 | Beus et al. | |
| 6,343,515 B1 | | 2/2002 | Dodson | |

* cited by examiner

*Primary Examiner*—Jewel Thompson
(74) *Attorney, Agent, or Firm*—Mark Homer

(57) ABSTRACT

The invention is a cable tensiometer that can be used on aircraft for real-time, in-flight cable tension measurements. The invention can be used on any aircraft cables with high precision. The invention is extremely light-weight, hangs on the cable being tested and uses a dual bending beam design with a high mill-volt output to determine tension.

14 Claims, 3 Drawing Sheets

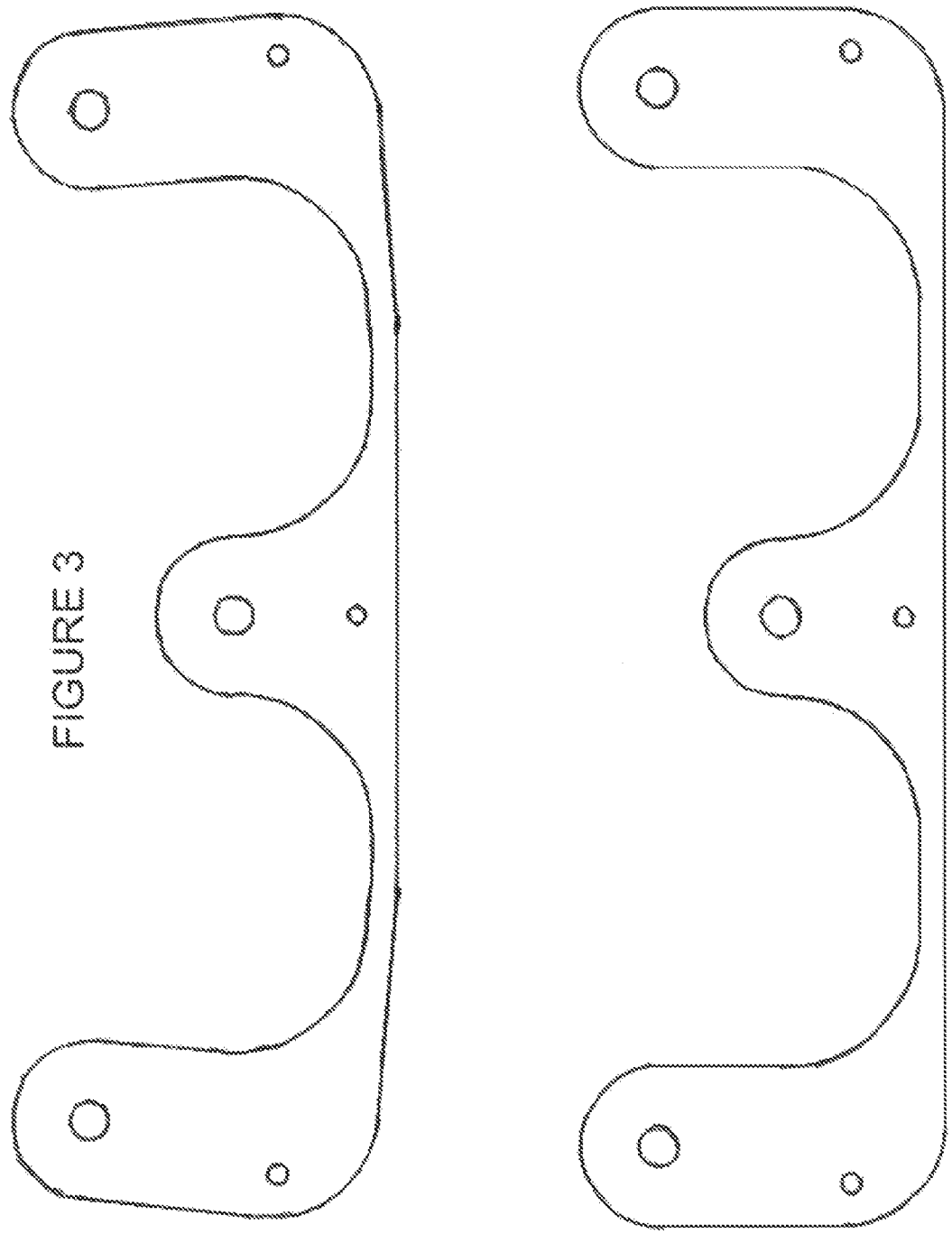

CABLE TENSIOMETER FOR AIRCRAFT

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention relates generally to measuring the tension on cables, more particularly to measuring the tension of fixed cables, and most particularly to measuring the tension of fixed cables on aircraft.

2. Description of the Related Art

Many aircraft employ numerous cables to make very sensitive flight related adjustments to operate the aircraft, such as to control surfaces, etc. Precise measurement of cable tension loads in real-time to ensure accurate aircraft operation related to such cables can significantly increase the effectiveness of such cables. Currently available cable tension monitoring devices cannot be employed for this purpose.

Devices for measuring the tension placed on wires and cables, known as tensiometers, have been used for many years in industries as varied as yarn manufacture to oil well drilling. Many tensiometers are designed so that the cable runs through the device and the tension on the cable as it travels is measured. Such devices are employed to make yarn or in industries that use cables that run through pulley systems to operate machinery. Such tensiometers cannot be employed for measuring tension on cables that are fixed at both ends, such as those used on aircraft.

Other tensiometers have been developed to work on such fixed cables, but have other inherent problems that would obviate their use on aircraft cables. For example, U.S. Pat. No. 4,989,450 discloses a hand held cable tensiometer that attaches to two points on a cable. However, this cable tensiometer employs a load cell to measure cable tension, which would be too large and heavy for operation in a flight environment.

U.S. Pat. Nos. 5,728,953 and 6,343,515 disclose cable tensiometers that use a bending beam configuration so that the requirement to employ a separate measuring device, such as a load cell, is not needed. These devices measure the tension in a cable by fixing the cable to the devices, which employ a fixed structure, and creating an angle in cable. When tension is placed on the cable, the angles causes the fixed structure to bend. The bending is measured via small strain gages that are also affixed to the fixed structure to obtain the tension placed on the cable. However, the U.S. Pat. No. 6,343,515 patent employs a separate tubular structure to hold the cable and deflection blocks to create the angle in the cable and the U.S. Pat. No. 5,728,953 patent employs a spacer block to create the angle in the cable, which increases the weight of the devices to a point where they could not be used in a flight environment. Further, the U.S. Pat. No. 6,343,515 patent clamps the cable to the tubular body and the U.S. Pat. No. 5,728,953 clamps the cable to the fixed structure. Such clamping creates significant friction on the cable and dramatically decreases the precision of the devices.

Therefore, it is desired to provide a cable tension measurement device for fixed cables that is precise, repeatable, and can operate in an aircraft flight environment.

SUMMARY OF THE INVENTION

The invention proposed herein comprises a cable tensiometer that can be used in flight to determine tension on aircraft cables with high precision. The invention hangs on a cable being tested and uses a dual bending beam design to determine tension.

Accordingly, it is an object of this invention to provide a cable tensiometer capable of use in aircraft flight.

It is a further object of this invention to provide a cable tensiometer that positively captures and secures the cable being tested.

It is yet a further object of this invention to provide a cable tensiometer that minimizes friction on the cable being tested so as, to maximize precision.

This invention meets these and other objectives related to an improved cable tensiometer by providing a cable tension measuring device comprising a beam structure that has first, second, and third extensions extending from the beam structure. The second extension is located between the first and third extension and equidistant from each. Two pulleys are rotatably attached to the first and third extensions. The pulleys are designed to have an inner surface to accept a cable. Each of the first and third extensions have an opening through them, located under the pulleys and across the extensions along the beam structure so that the cable can be inserted on the lower inner surface of each pulley and the pulleys may still rotate. The second extension has a slot, located at its apex comprising a width sufficient to accept the cable. After the cable is inserted through the pulleys and placed in the slot, a guard is fastened across the slot to keep the cable in place. After the cable has been inserted through the pulleys and placed into the slot, an angle is formed between the cable and a line parallel to the beam structure to provide for bending of the beam structure when tension is placed on the cable. Finally, at least two gages are located on the beam structure capable of determining beam structure bending between the first and second extensions and between the second and third extensions.

BRIEF DESCRIPTION OF THE DRAWINGS

In the drawings, which are not necessarily to scale, like or corresponding parts are denoted by like or corresponding reference numerals.

FIG. 3 shows the difference between the beam structure of embodiment of the invention depicted in FIG. 1 bent as it would be if under cable tension (top) compared to under no cable tension (bottom).

DESCRIPTION OF PREFERRED EMBODIMENTS

The present invention has been designed to provide a real-time tension measuring device for in-fight use on aircraft cables. For aircraft being currently: developed, tension measurements must be precise to within 2 percent full scale ("FS") and repeatable within 0.5 percent FS. The device must also be light-weight in order to minimize cable/control surface coupling and must also meet low-end flight environmental testing requirements.

In order to meet these requirements, the invention is designed as a dual bending beam tensiometer that employs pulleys to minimize cable friction and uses the physical design to create the cable angle, rather than spacer blocks or similar extraneous components, in order to reduce the device weight.

In general, the invention is a cable tensiometer comprising a beam structure with three extensions extending from the beam structure. The middle extension is equidistant from the outer extensions and is located in the center of the beam structure. Preferably, the outer extensions are located at the ends of the beam structure. The outer extensions have rotatable pulleys mounted near the top of the extensions in a manner so that a cable may be inserted on the bottom, inner surface of the pulleys. The middle extension has a slot at its apex that can accept a cable within the slot. When the cable is threaded through the device, it is placed on the bottom, inner surface of each pulley and in the slot so that it extends over the beam structure. The slot of the middle extension comprises a height that is higher than the bottom, inner surface of the pulleys. When the cable is placed in the device, this creates an angle in the cable. Therefore, when tension is applied to the cable, the beam structure bends. Due to the middle extension being centered on the beam structure and the outer extensions being equidistant from the middle extension, bending between each of the outer extensions and the middle extension on the beam structure is equal. One or more gages, preferably coupled, half bridge strain gages on each of the upper and lower surfaces of the beam structure, are attached on each side of the beam structure to measure the bending between each outer extension and the middle extension.

Figure 1:
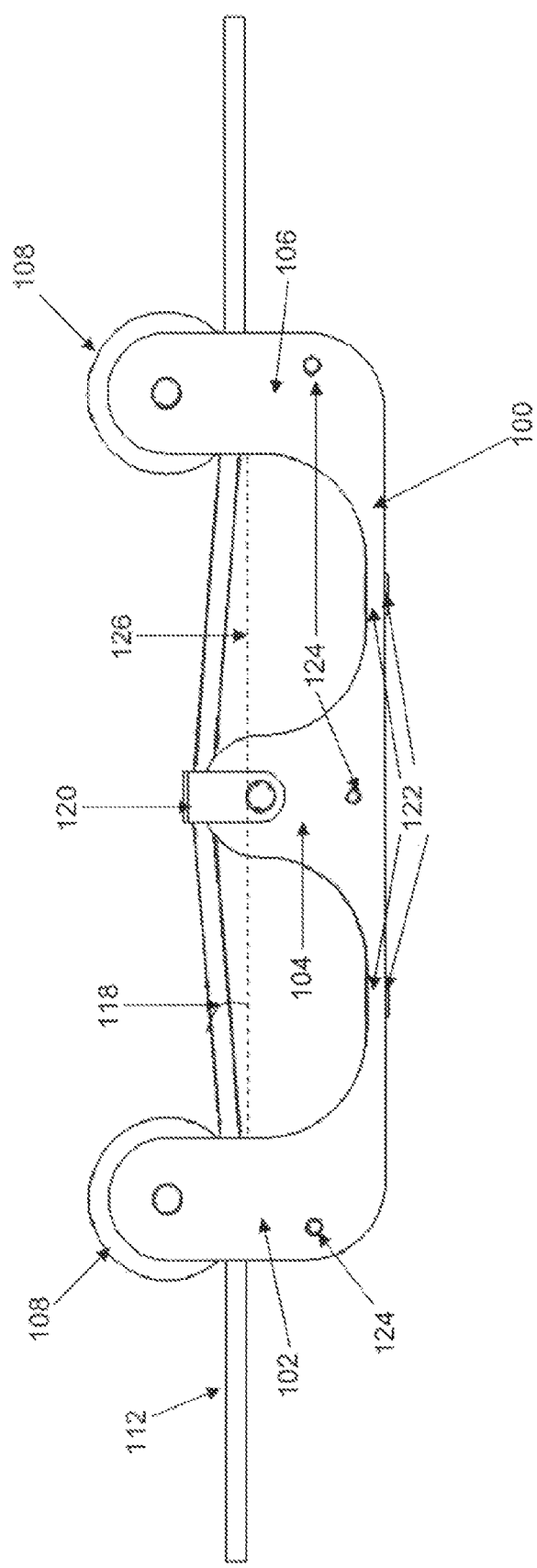
FIG. 1 depicts a side view of the invention.
Figure 2:
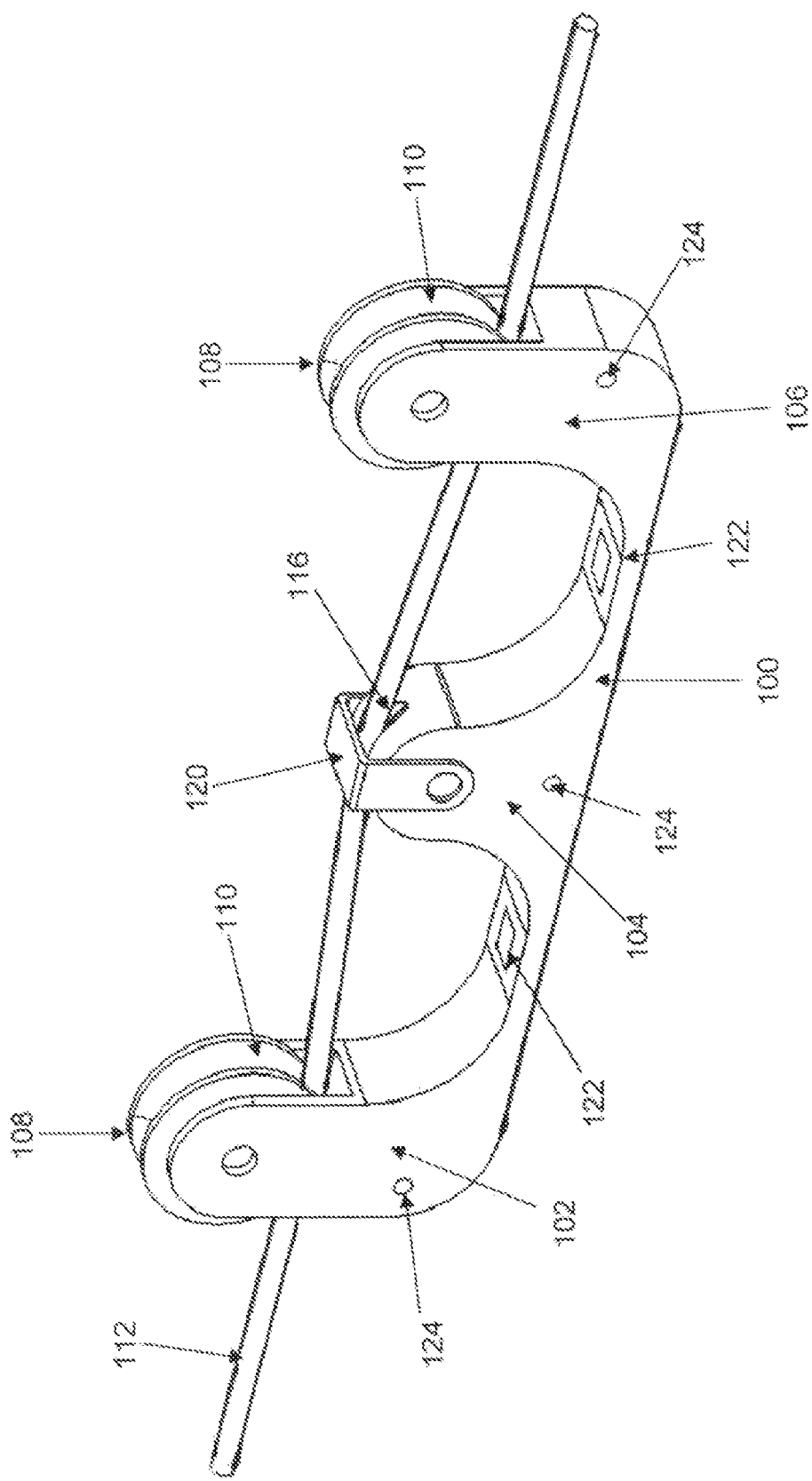
FIG. 2 depicts an angled view of the embodiment of the invention depicted in FIG. 1.

Referring to FIGS. 1 and 2, the invention comprises a beam structure 100 having first, second, and third extensions 102, 104, 106 extending from the beam structure 100. Preferably, the extensions 102, 104, 106 and the beam structure 100 are fabricated as one piece, rather than the extensions 102, 104, 106 being separate and affixed to the beam structure 100. The second extension 104 is located between the first and third extensions 102, 106, in the center of the beam structure 100. Preferably, the first and third extensions 102, 106 are located at ends of the beam stricture 100.

The first and third extensions 10, 106 have two pulleys 108 rotatably attached thereto. The pulleys have an inner-surface 110 wherein a cable 112 may be placed. Openings 114 are formed in first and third extensions 102, 106 for pulley 108 rotation so that the pulleys 108 may rotate when the cable 112 is placed on the bottom side of the inner surface 110.

A slot 116 is located at the top apex of the second extension 104. The slot 116 is capable of accepting the cable 112. The slot 116, and, therefore, the top apex of the second extension 104, has a height that is greater than the bottom inner surface 110 of the pulleys 108. Thus, when the cable 112 is threaded through the device and is placed in the slot 116 and on the inner surface 110 at the bottom of the pulleys 108, the cable 112 forms an angle 118 with respect to the beam structure 100 as depicted by an imaginary line 126 drawn between the inner surface 110 of the bottom of the pulleys 108.

After the cable 112 is placed in the slot 116, a guard 120 is placed over the cable 112 to prevent the device from moving along the cable 112 during operation.

At least one strain gage 122, is placed on the beam structure 100 between both the first and second extensions 102, 104 and the second and third extensions 104, 106. Preferably, at least one pair of coupled, half bridge strain gages are placed on the upper and lower surfaces of the beam structure, opposite each other. Each half bridge strain gage is wired to the corresponding half bridge strain gage on the opposite side, comprising a full bridge, such that the gages are capable of measuring bending of the beam structure 100 between each of the extensions 102, 104, 106. Due to the design of the present invention, the tension on the cable 112 measured by each full bridge of strain gages 122 should be equivalent (within precision error of the device) to provide redundant tension measurements.

In a preferred embodiment of the invention, holes 124 are formed through the first and third extensions 102, 106 to allow the device to be tethered in place on the cable 112 to further prevent movement of the device along the cable 112 or to secure instrumentation wiring to the device. An additional threaded hole 124 may be formed through extension 104 to provide for further securing instrumentation wiring if desired.

The dimensions and material construction of the beam structure 100 and extensions 102, 104, 106 should be selected to provide the maximum deflection (bending) of the beam structure 100 from cable tension, but also provide strength sufficient to ensure physical integrity of the device. The preferred material to construct the beam structure 100 and extensions 102, 104, 106 is aluminum with the most preferred material comprising 2024-T3 aluminum. The preferred length of the beam structure 100 is between 3 and 10 inches, depending upon the pulley 108 diameter and the maximum cable 112 load. The preferred width of the beam structure, based on these same design parameters, is between 0.25 and 1.5 inches. The thickness of the beam structure 100 is preferably between 0.02 and 0.5 inches and in one embodiment of the invention the top portion of the beam structure 100 is parallel to the bottom of the beam structure 100 on in the center portion of the beam structure 100, between the extensions. However, in this embodiment the top portion, from the flat middle, parallel area, curves upwards toward the extensions 102, 104, 106. In this configuration, the thickness of the beam structure 100 will be minimized at the center point between the first and second, extensions 102, 104 and the second and third extensions 104, 106. This configuration allows for greater beam structure 100 flexibility to increase deflection.

The first and third extensions 102, 106 are preferably between 1.5 to 8-inches high so that the lower portion of the inner surface 110 of the pulleys 108 are at a height between 0.8 and 5 inches. These heights are dependant upon the pulley 108 diameter and the desired cable angle 118.

The preferred diameter of the pulleys 108 ranges between 0.5 and 5 inches depending upon the cable 112 diameter and cable radius desired around the pulley 108. The cable 112 preferred diameter is up to about 0.5 inches and the preferred cable angle 118 is from about 2 degrees to about 8 degrees with a most preferred cable angle 118 being about 5 degrees.

The pulleys 108, preferably low-friction, stainless steel ball bearing-pulley, are provided to reduce or virtually eliminate friction on the cable 112 when placed under tension. Therefore, they should be fastened to the first and third extensions 102, 106 using solid clevis pins, with tight tolerances, and cotter keys or hitch pins to secure the clevis pins or other methods known in the art. The pulley 108 material should also be selected to be a corrosion-resistant material, such as stainless steel.

The strain gages 122 should be light weight and high precision and may be selected by one skilled in the art. Examples of strain gages 122 that may be employed in the present invention include foil-resistive type or Fiber Bragg Grating sensors.

The operation of the invention will now be described. A cable is threaded through the device so that the cable rests against the lower, inner surface of the pulleys and over the second extension in the slot. The guard is fastened over the slot to hold the cable in place, so the device does not move along the cable. As forces cause tension along the cable, the angle of the cable causes the cable to be pulled from each pulley so that the beam structure bends (see FIG. 3). The strain gages placed between the first and second extensions and the second and third extensions measure the amount of bending of the beam structure in these sections. As stated above, within degree of error of the device each section of the beam structure should bend the same amount.

The basic equations used to determine the tension are as follows.

Resultant Force Equation $$R = (F1 \cdot \sin \alpha)/\sin \theta \qquad (1)$$

where R=resultant force, F1=cable tension, $\alpha$=cable angle between outer pulleys (10°), and $\theta$=cable angle from principle direction and center apex (½$\alpha$).

Bending Stress Equation $$\sigma = (6M)/(bh^2) \qquad (2)$$

where $\sigma$=stress in psi M bending moment in inch-pounds (force·distance), b=width of transducer where measurement is taken, and $h^2$=height or thickness squared where measurement is taken.

Strain Equation $$\epsilon = \sigma/E \qquad (3)$$

where $\epsilon$=strain in inches/inch, $\sigma$=stress in psi, and E=modulus of elasticity.

Voltage Output Equation $$e_o = N/4 \cdot GF \cdot \epsilon \cdot E_x \qquad (4)$$

where $e_o$=voltage output, N=number of active arms, GF=gage factor $\epsilon$=strain in inches/inch, and $E_x$=excitation voltage.

When the above equations are employed, the resultant force on the pulleys and center apex, the bending stress, the average surface strain, and the voltage output of the strain gage full bending bridge may be determined.

What is described are specific examples of many possible variations on the same invention and are not intended in a limiting sense. The claimed invention can be practiced using other variations not specifically described above.

What is claimed is:

1. A cable tension measuring device, comprising:
   a beam structure comprising first, second, and third extensions, the second extension located between and equidistant from the first and third extensions;
   two pulleys, each rotatably attached to the first and third extensions, having an inner surface to accept a cable;
   two openings on the first and third extensions, located below the pulleys to allow insertion of the cable on a bottom side of the inner surface and rotation of the pulleys;
   a slot, located at a top of the second extension, comprising a width sufficient to accept the cable;
   a guard, fastened to the top of the second extension, over the slot, to hold the cable in place within the slot;
   an angle formed between the cable and a line parallel to the beam structure, extending between the bottom sides of the pulleys, when the cable is inserted on the inner surface on the bottom side of the pulleys and in the slot; and,
   at least two gages located on the beam structure capable of determining beam structure bending between the first and second extensions and between the second and third extensions.

2. The cable tension measuring device of claim 1, wherein the first and third extensions comprise equal heights and the second extension comprises a height less than the height of the first and third extensions.

3. The cable tension measuring device of claim 2, wherein the angle comprises between 2 degrees and 8 degrees.

4. The cable tension measuring device of claim 3, wherein the angle comprises about 5 degrees.

5. The cable tension measuring device of claim 2, wherein the height of the first and third extensions comprises between 1.5 inches and 8 inches.

6. The cable tension measuring device of claim 5, wherein the height of the second extension comprises between 0.8 inches and 5 inches.

7. The cable tension measuring device of claim 2, wherein the pulleys comprise a stainless steel inner surface and stainless steel ball bearings.

8. The cable tension measuring device of claim 2, wherein the slot and pulleys can accept cable having a width up to 0.5 inches.

9. The cable tension measuring device of claim 2, wherein the gages comprises strain gages.

10. The cable tension measuring device of claim 9, further comprising at least two strain gages each between the first and second extensions and the between the second and third extensions.

11. The cable tension measuring device of claim 10 wherein the at least four strain gages comprise a full bridge strain gage.

12. The cable tension measuring device of claim 1, wherein the beam structure and the extensions comprise an aluminum material.

13. The cable tension measuring device of claim 1, further comprising at least one hole through the first, second, and third extensions.

14. A method for determining the tension on a fixed cable, comprising the steps of:
   providing a device comprising a beam structure comprising first, second, and third extensions, the second extension located between and equidistant from the first and third extensions, two pulleys, each rotatably attached to the first and third extensions, having an inner surface to accept a cable, two openings on the first and third extensions, located below the pulleys to allow insertion of the cable on a bottom side of the inner surface and rotation of the pulleys, a slot, located at a top of the second extension, comprising a width sufficient to accept the cable, an angle formed between the cable and a line parallel to the beam structure when the cable is inserted on the inner surface on the bottom side of the pulleys and in the second extension slot, and, at least two gages located on the beam structure capable of determining beam structure bending between the first and second extensions and between the second and third extensions;
   inserting the cable on the inner surface and bottom of the pulleys and into the second extension slot;
   fastening a guard over the slot to hold the cable in place; and,
   monitoring the gauges to determine bending of the beam structure.

* * * * *